(12) United States Patent
Kirrbach

(10) Patent No.: US 12,092,806 B2
(45) Date of Patent: Sep. 17, 2024

(54) OPTICS FOR TRANSMISSION AND/OR RECEPTION ELEMENT

(71) Applicant: Fraunhofer-Gesellschaft zur Förderung der angewandten Forschung e.V., Munich (DE)

(72) Inventor: René Kirrbach, Dresden (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 775 days.

(21) Appl. No.: 17/116,364

(22) Filed: Dec. 9, 2020

(65) Prior Publication Data

US 2021/0116689 A1 Apr. 22, 2021

Related U.S. Application Data

(63) Continuation of application No. PCT/EP2019/064890, filed on Jun. 6, 2019.

(30) Foreign Application Priority Data

Jun. 12, 2018 (DE) .................... 10 2018 209 368.7

(51) Int. Cl.
  *G02B 27/30* (2006.01)
  *F21V 8/00* (2006.01)
  (Continued)

(52) U.S. Cl.
  CPC .......... *G02B 19/0028* (2013.01); *G02B 3/08* (2013.01); *G02B 6/003* (2013.01); *G02B 6/32* (2013.01);
  (Continued)

(58) Field of Classification Search
  CPC ...... G02B 27/30; G02B 19/0028; G02B 3/08; G02B 6/003
  See application file for complete search history.

(56) References Cited

U.S. PATENT DOCUMENTS 4,805,984 A  2/1989 Cobb, Jr.
5,526,190 A  6/1996 Hubble, III et al.
(Continued)

FOREIGN PATENT DOCUMENTS

CN  1726410 A  1/2006
CN  101707502 A  5/2010
(Continued)

OTHER PUBLICATIONS

D. Ma, Exploration of Ray Mapping Methodology in Freeform Optics Design for Non-Imaging Applications, Dissertation, The University of Arizona, 2015.
(Continued)

*Primary Examiner* — Ryan D Howard
(74) *Attorney, Agent, or Firm* — Bridgeway IP Law Group, PLLC; Jihun Kim

(57) ABSTRACT

Optics for a transmission and/or reception element configured to emit and/or receive a signal in a main radiation direction has an optical body formed of a material optically transparent for the communication wavelength. It has a cavity within which the transmission/reception element is arranged, wherein a first interface is formed between the cavity and the optical body. Furthermore, the optical body has a second interface formed opposite the cavity and a lateral interface having a total internal reflection region. The first interface forms a first central lens region and a first refraction region surrounding the first central lens region. The second interface forms a second central lens region and a second refraction region surrounding the second central lens region. All the surfaces or areas described are defined to be freeform areas so that they can exhibit any shape. In addition, it is conceivable to introduce Fresnel patterns in the surfaces.

21 Claims, 4 Drawing Sheets

Fig. 5a

(51) Int. Cl.
  *G02B 3/08* (2006.01)
  *G02B 6/32* (2006.01)
  *G02B 6/42* (2006.01)
  *G02B 19/00* (2006.01)

(52) U.S. Cl.
  CPC .......... *G02B 6/4206* (2013.01); *G02B 6/4246* (2013.01)

(56) References Cited

U.S. PATENT DOCUMENTS

| | | | |
|---|---|---|---|
| 5,699,462 | A | 12/1997 | Barth et al. |
| 5,785,404 | A | 7/1998 | Wiese |
| 6,055,344 | A | 4/2000 | Beck et al. |
| 6,529,655 | B1 | 3/2003 | Jurbergs |
| 8,068,288 | B1 | 11/2011 | Pitou |
| 8,430,536 | B1 | 4/2013 | Zhao |
| 9,010,967 | B2 * | 4/2015 | Jensen ............... G02B 19/0066 362/296.01 |
| 9,423,090 | B1 | 8/2016 | Deyaf et al. |
| 9,718,395 | B1 | 8/2017 | Deyaf et al. |
| 2001/0004294 | A1 | 6/2001 | Romanovsky |
| 2002/0067879 | A1 | 6/2002 | Fouquet et al. |
| 2002/0118147 | A1 | 8/2002 | Solomon |
| 2002/0181835 | A1 | 12/2002 | Hu et al. |
| 2004/0070855 | A1 | 4/2004 | Benitez et al. |
| 2004/0179784 | A1 | 9/2004 | Adrianus et al. |
| 2005/0057187 | A1 | 3/2005 | Catalano |
| 2006/0012784 | A1 | 1/2006 | Ulmer |
| 2007/0103646 | A1 | 5/2007 | Young |
| 2008/0062513 | A1 | 3/2008 | Ryota et al. |
| 2008/0092879 | A1 | 4/2008 | Pablo et al. |
| 2008/0278092 | A1 | 11/2008 | Lys et al. |
| 2009/0128921 | A1 | 5/2009 | Roth |
| 2010/0046242 | A1 | 2/2010 | Lambert et al. |
| 2010/0208328 | A1 | 8/2010 | Heikenfeld et al. |
| 2010/0296283 | A1 | 11/2010 | Ford et al. |
| 2011/0110625 | A1 | 5/2011 | Chatigny |
| 2011/0110666 | A1 | 5/2011 | Shin et al. |
| 2011/0132432 | A1 | 6/2011 | Fine et al. |
| 2012/0044699 | A1 | 2/2012 | Anderson |
| 2012/0069595 | A1 | 3/2012 | Catalano |
| 2012/0140462 | A1 | 6/2012 | Pickard |
| 2012/0163547 | A1 | 6/2012 | Michael et al. |
| 2013/0028387 | A1 | 1/2013 | Lee |
| 2013/0056749 | A1 | 3/2013 | Philippe et al. |
| 2014/0133168 | A1 | 5/2014 | Thomas et al. |
| 2014/0274658 | A1 | 9/2014 | Brian et al. |
| 2015/0146435 | A1 | 5/2015 | Greenwood et al. |
| 2015/0205108 | A1 | 7/2015 | Border et al. |
| 2015/0252979 | A1 | 9/2015 | Bailey |
| 2015/0349881 | A1 | 12/2015 | Byers |
| 2016/0195240 | A1 | 7/2016 | Pelejo et al. |
| 2016/0218025 | A1 | 7/2016 | Alborz et al. |
| 2016/0265728 | A1 | 9/2016 | Jeremy et al. |
| 2019/0016238 | A1 | 1/2019 | Denis et al. |

FOREIGN PATENT DOCUMENTS

| | | |
|---|---|---|
| CN | 102132183 A | 7/2011 |
| CN | 106464360 A | 2/2017 |
| DE | 300 326 A7 | 6/1992 |
| DE | 10 2008 061688 A1 | 6/2010 |
| DE | 20 2013 000685 U1 | 2/2013 |
| DE | 10 2012 202508 B4 | 9/2013 |
| DE | 10 2016 109159 A1 | 11/2017 |
| EP | 2 827 179 A2 | 1/2015 |
| WO | 2017/032655 A1 | 3/2017 |
| WO | 2018/010992 A1 | 1/2018 |
| WO | 2019/231601 A1 | 12/2019 |

OTHER PUBLICATIONS

D. Ma et al., Freeform illumination lens design using composite ray mapping, Applied Optics, Jan. 20, 2015, pp. 498-503, vol. 54, No. 3.

* cited by examiner

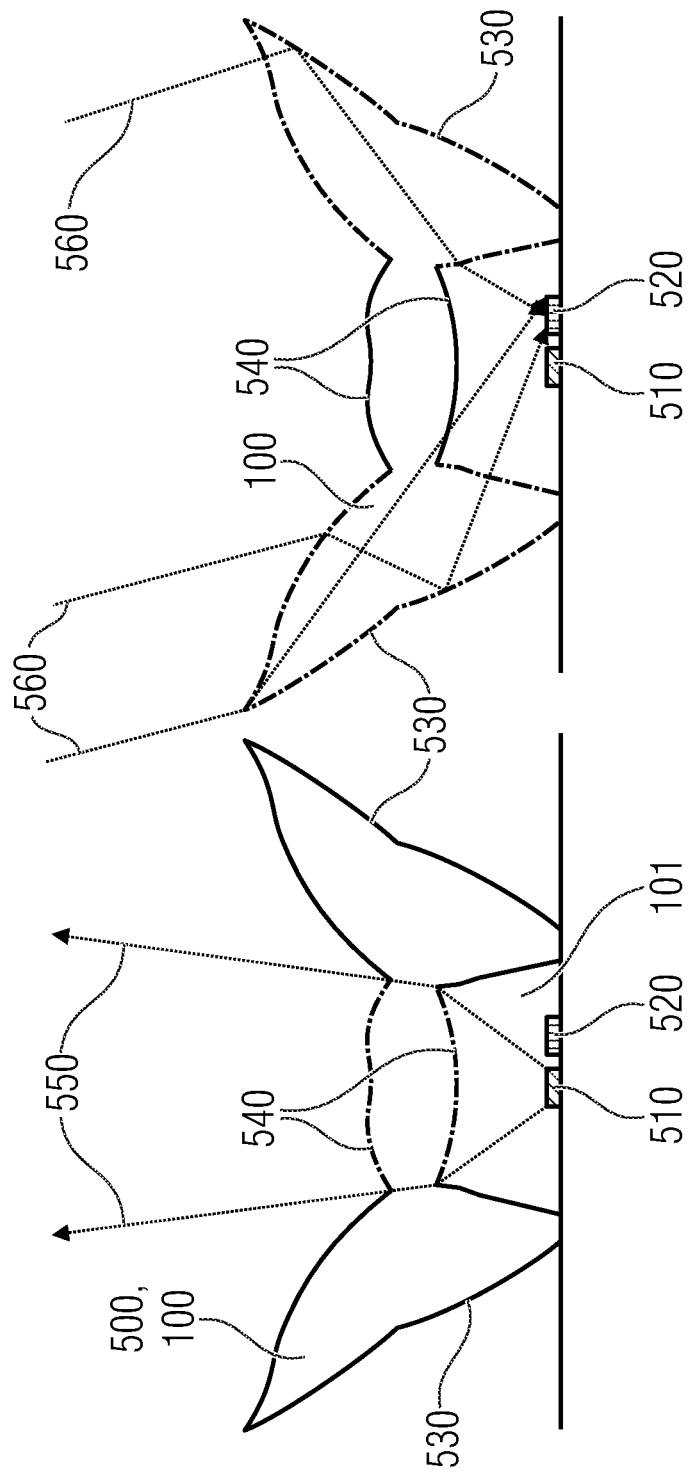

OPTICS FOR TRANSMISSION AND/OR RECEPTION ELEMENT

CROSS-REFERENCE TO RELATED APPLICATIONS

This application is a continuation of copending International Application No. PCT/EP2019/064890, filed Jun. 6, 2019, which is incorporated herein by reference in its entirety, and additionally claims priority from German Application No. 10 2018 209 368.7, filed Jun. 12, 2018, which is also incorporated herein by reference in its entirety.

BACKGROUND OF THE INVENTION

Embodiments of the present invention relate to optics for a transmission and/or reception element and to a corresponding method for manufacturing. Further embodiments relate to a communication module having corresponding optics and a transmission or transmission/reception element, to an array of communication modules and to a communication module system.

Optical wireless communication operates using well-defined fields of view within which a communication channel is established. A spot is the region in the target plane, irradiated by a transmitter (Tx), within which communication is ensured. The receive power at the receiver (Rx) directly defines the signal intensity and, thus, the quality of the signal at the receiver. In the following description, it is assumed that a transmitter in combination with a receiver forms an optical wireless transceiver. Transmitters, receivers or transceivers can generally be understood to be communication modules.

Within the spot, the power is to be distributed as homogenously as possible in order for the signal quality and, thus, the bit error rate in the target region to be constant. When using a modulation type with bit loading, it can additionally be ensured that the data rate within the spot also remains constant. In the transmitter, typically light-emitting diodes (LEDs) or laser diodes (LDs) are used as emitters. LEDs are cheap and offer a high output power. Since the radiation within the LEDs is emitted isotropically, LEDs exhibit a very wide radiation profile. In addition, the spatial dimension of an LED usually is considerably larger than that of a laser diode, since typically primary optics is integrated in the housing of the LEDs and the corresponding chip is cast in plastic. These two factors make it difficult to transfer the entire emitted radiation to a well-defined spot having both a homogenous power distribution and sharp edges. Up to now, the problem has been solved by a combination of lenses and mirrors. However, disadvantages result in that the resulting overall system is comparatively large. In addition, the manufacturing costs are high since two components have to be manufactured and mounted. This cost factor becomes particularly critical when using a non-rotationally symmetrical channel, which uses non-rotationally symmetrical freeform optics. In addition, such an overall system is less efficient since absorption losses at the mirror result. In LDs, beam-forming can be performed more easily since they typically emit over a smaller solid angle than LEDs. LDs and the respective drive electronics, however, are more expensive than that of LEDs. Therefore, there is demand for an improved optics concept in order to be able to use LEDs effectively.

It is the object of the present invention to provide an optics concept for optical wireless communication apparatuses which transfers any radiation characteristic of an emitter to any shape of field of view. Thus, emphasis is placed on obtaining high efficiency and a specified power distribution within the spot, as well as cheap manufacturing.

SUMMARY

According to an embodiment, a data communication module having optics and a transmission or a reception element or a transmission and reception element arranged in a cavity or centrally in a cavity and configured to emit and/or receive a signal in a main radiation direction, wherein the optics has an optical body formed of a material optically transparent for the communication wavelength, having: the cavity, wherein a first interface is formed between the cavity and the optical body; a second interface formed opposite the cavity; and a lateral interface of any shape having a total internal reflection region; wherein the first interface forms a first central lens region and a first refraction region surrounding the first central lens region, and wherein the second interface forms a second central lens region and a second refraction region surrounding the second central lens region; wherein the first and second lens regions are configured to map a first beam group in the direction of the main radiation direction; and wherein the second refraction region of the second interface is configured to map a second beam group along a second radiation direction which is angled to the main radiation direction.

Another embodiment may have an array of data communication modules having an inventive data communication module as mentioned above, wherein a first beam group is mapped in the direction of the main radiation direction by means of the first and second lens regions and at least a second beam group is mapped by means of the total internal reflection region and/or the first and second refraction regions; or wherein a first beam group is mapped in the direction of the main radiation direction by means of the first and second lens regions and at least a second beam group is mapped by means of the total internal reflection region and/or the first and second refraction regions; and wherein the first and second beam groups are mapped such that a transmission signal and a reception signal alternate along a lateral extension direction of the transceiver array.

Another embodiment may have an array of inventive data communication modules having spatially separate transmitter and receiver as mentioned above, wherein the transceivers are arranged next to one another; or wherein the communication modules arranged next to one another are arranged such that a transmitter configured for transmitting alternates with a receiver configured for receiving along an extension direction of the transceiver array.

Still another embodiment may have a system of several inventive data communication modules having at least two arrays of data communication modules as mentioned above, wherein the arrays of communication modules are opposite one another such that a lens region configured for receiving or second refraction region is geometrically associated to a lens region configured for transmitting or second refraction region; or wherein the arrays of communication modules are opposite one another such that a receiver configured for receiving is geometrically associated to a transmitter configured for transmitting.

Another embodiment may have an array of inventive data communication modules as mentioned above, wherein a lens region configured for receiving or second refraction region has a square or rectangular shape; or wherein a receiver configured for receiving comprises a square or rectangular interface.

Embodiments of the present invention provide optics for a transmission and/or reception element configured to emit and/or receive a signal in the direction of a main radiation direction. The optics comprises an optical body formed of a transparent material (like glass or plastics, for example). The term "transparent" relates to the wavelength used for communication. Thus, the optics can exemplarily be non-transparent in the visible range when using the near-infrared range for communication. The optics comprises at least one cavity and a second interface formed opposite the cavity. In addition, the geometrical shape of the optics is such that it comprises another lateral (outer) interface including a total internal reflection region. The transmission and/or reception element can be arranged within the cavity. The cavity is formed in the optical body such that a first interface is formed between the cavity and the optical body. The first interface forms a first central lens region (region of any, but mostly convex curvature) and a first refraction region surrounding the central lens region, enclosing the central lens region and shaping the cavity together with the central lens region. The second interface forms a second central lens region (of any curvature) and a second refraction region surrounding the second central lens region. All the surfaces are freeform surfaces or areas, which can comprise any curvature. Thus, an area or surface can be partially convex, but concave at a different location. This serves for obtaining the specified power distribution within the spot.

In accordance with embodiments, the two lens regions cooperate to map a first beam (or ray) group (along the main radiation direction). The refraction regions (the first and second interfaces) and the total internal reflection region exemplarily also cooperate to map a second beam group. It is to be mentioned here that the first beam group can exemplarily be used for the case of transmission, whereas the second and further beam groups can exemplarily be used for the case of reception. This can, of course, also be reversed since in principle every beam group can be used for different cases (case of transmission or reception) so that several Tx and Rx channels can be realized at the same time by using the optics. Thus, a cheap MIMO (multiple input-multiple output) concept can be realized.

Embodiments of the present invention are based on the finding that optics which is based both on refraction (cf. lens regions) and total internal reflection (maybe in several regions) combines the functionality of mirrors and lenses in a single element so that the radiation emitted for example by an emitter in the optics is (along the main radiation direction) directed to the field of view (FOV) by the transmitter optics. This is achieved by bundling the radiation emitted or transmitted along the main radiation direction by the first and second lens regions (which are exemplarily arranged to each other in an aligned manner or are aligned such that the optical axes thereof are located on the main radiation axis), whereas the radiation emitted laterally or the radiation emitted in an inclined manner is caught by the total internal reflection region (plus first and second refraction regions) and directed along or inclined to the main radiation direction. The system complexity is reduced by this single optical element.

In accordance with embodiments, the total internal reflection region can comprise Fresnel patterns. Fresnel patterns can be introduced in all refracting surfaces in order to reduce the thickness of the optics.

In accordance with embodiments, the main radiation axis can pass through the transmission and/or reception element. As has been mentioned before, the two lens regions (which can be arranged to be aligned to each other) serve for mapping a first beam group in the direction of the main radiation direction. It is to be mentioned here that, in the optics discussed here, reflection losses (Fresnel losses) at the interfaces are the only relevant loss factor. In accordance with additional embodiments, these losses can be minimized by optional anti-reflection coatings.

In accordance with an embodiment, the lateral interface or total internal reflection region encloses an angle in the range from 5° to 85° with the main radiation direction. In accordance with further embodiments, this lateral total internal reflection region can comprise two or more sub-regions (which are angled relative to one another). By means of the total internal reflection region, in combination with the interfaces, a second and further beam groups apart from the first beam group (cf. lens region) can be shaped in a spatially separate manner. Using a total internal reflection region comprising two or more sub-regions, two or more beam groups apart from the first beam group can be shaped in a spatially separate manner. This means that the optics discussed here is able to spatially separate several communication channels from one another so that, depending on the implementation of the total internal reflection region, two or even three or more communication channels can be set up in a spatially separate manner. The background situation here is that a transmitter exemplarily transmits towards several receivers located in different spatial directions. A separation of the channels reduces the geometrical optical loss when compared to a case in which emission takes place over the entire space. This allows increasing the range or data rate of the communication channel when the relative positions of transmitter and receiver remain constant. In accordance with further embodiments, the data rate of a communication link can be increased by combining several channels to form a so-called "multiple input multiple output" (MIMO) system. In this system, crosstalk between the channels can be avoided by the good separation between the channels as mentioned before. In the optics module mentioned before, advantageously, a plurality of parallel channels are realized in the smallest space possible. Such an approach would not be possible in an easy, compact, efficient and cheap manner using the known means mentioned above based on a combination of mirrors and lenses.

In accordance with embodiments, the total internal reflection region can comprise surfaces of any curvature. When assuming that the total internal reflection region comprises several sub-regions, each of the sub-regions may also be curved.

In accordance with further embodiments, the first refraction region of the first interface is arranged such that the interface encloses an angle of smaller than or equaling 45° with the main radiation direction. In accordance with further embodiments, the second refraction region of the second interface is arranged relative to the main radiation direction such that an angle of greater than or equaling 45° is enclosed. With regard to the second refraction region, it is to be mentioned that it may also exhibit any curvature to shape the beam groups and emit the radiation reflected via the total internal reflection region correspondingly to the field of view so that the specified power distribution in the spot results. Here, in accordance with embodiments, the curvature can also be such that two or more sub-regions are formed. These can comprise different angles relative to one another or form a different angle relative to the main radiation direction. This is of particular advantage when the total internal reflection region is also implemented in two or more parts. Using two or more sub-regions advantageously allows a second, third, . . . beam group to be formed along a second, third, . . . radiation direction, which is angled to the main radiation direction.

In accordance with embodiments, the optical body is non-rotationally symmetrical or rotationally symmetrical. Here, it would be conceivable for a rotational symmetry to be formed by the transmission and/or reception element around an axis along the main emission direction or, more precisely, around an axis along the main emission direction. When providing an axis as a rotation symmetry axis, in accordance with embodiments, it passes centrally through the first and second lens regions. If, however, the body does not exhibit a rotational symmetry, axial symmetry is conceivable. The overall body could then be formed of two mirrored halves or four mirrored quarters, etc.

It is to be mentioned here that the optics can be used both for a transmitter and for a receiver. At the same time, it is also possible for the optics to be used for a combination of transmitter and receiver.

Embodiments provide a transmitter or a receiver or a transceiver having the corresponding transmission and/or reception element and the optics, wherein the transmission and/or reception element is arranged centrally in the cavity or, generally, in the cavity. An LED or LD can be used as a transmission element, whereas a detector, like a photodiode, for example, can, for example, be the reception element. It is to be mentioned here that generally any receiver or any transmitter and any transceiver can be understood to be a communication module. Transmitters and receivers exclusively transmit and receive, respectively, wherein a transceiver is able to both receive and transmit. In accordance with embodiments, a receiver configured for receiving advantageously comprises a square or rectangular shape of the second interface. With regard to the embodiment including the limitation to the transmission or reception mode, it is to be mentioned that such transmitters/receivers are very typical in which the counterpart, i.e. a receiver/transmitter, is arranged next to it. The background here is that a separation of transmitter and receiver is occasionally desired in order to reduce crosstalk. In this case, separate Tx and Rx optics are used. In accordance with another embodiment, both a transmitter and a receiver unit can be arranged in the cavity when spatially separate beam groups are transferred, for example via the surfaces of total internal reflection or, generally, via the interface. Here, a Tx channel is established, for example, via the lens region, whereas an Rx channel or several Rx channels or even a combination of Tx and Rx channels are established over the outer regions, i.e., among other things, by the total internal reflection region. By combining both optics (Tx and Rx) to form a single module, the complexity, the manufacturing cost and the size of the overall system can be reduced considerably.

Further embodiments provide a transceiver array comprising at least two transceivers arranged next to one another or having a transmitter/receiver arrangement in combination with optics, configured to transfer spatially separate beam groups via the interfaces. In accordance with a variation, the first one of the two communication modules arranged next to each other can be configured for the transmission mode, whereas the other one is configured for the reception mode. This array can, of course, be extended as desired in every direction so that the result is an N*1 or 1*N or N*N matrix, wherein advantageously receivers and transmitters alternate. In accordance with another variation, using the optics discussed before, several Tx or Rx or also Tx-Rx channels can be transferred via different regions of the optics. This means that transmitter and receiver can be united in a transceiver with optics and an array can be provided from these elements. Here, several units can also be combined as an N*1 or 1*N or N*N matrix in order to realize even more channels.

These arrays allow transmitting several channels next to one another. Thus, another embodiment comprises a transceiver system having at least two transceiver arrays arranged opposite each other, wherein a receiver configured for receiving is geometrically associated to a transmitter configured for transmitting.

In accordance with further embodiments, a method for manufacturing the above optics is provided, comprising a step of shaping the optical body. Here, the step is performed such that the optical material is distributed homogenously in the optical body. Milling, injection molding, turning, 3D printing or the like with sufficient precision are potential technologies of manufacturing. In these methods for manufacturing, the optical body is produced in one step, making production significantly easier and thus resulting in a considerable reduction in the manufacturing costs for large numbers of pieces. This cost reduction is particularly significant when compared to the known approaches in which a combination of several components was used. Manufacturing two components and mounting these increases the costs.

BRIEF DESCRIPTION OF THE DRAWINGS

Embodiments of the present invention will be discussed below referring to the enclosed drawings, in which:

FIGS. 5a, 5b show a schematic illustration of optics in combination with a transmission element and a reception element in accordance with further embodiments.

DETAILED DESCRIPTION OF THE INVENTION

Figure 1:
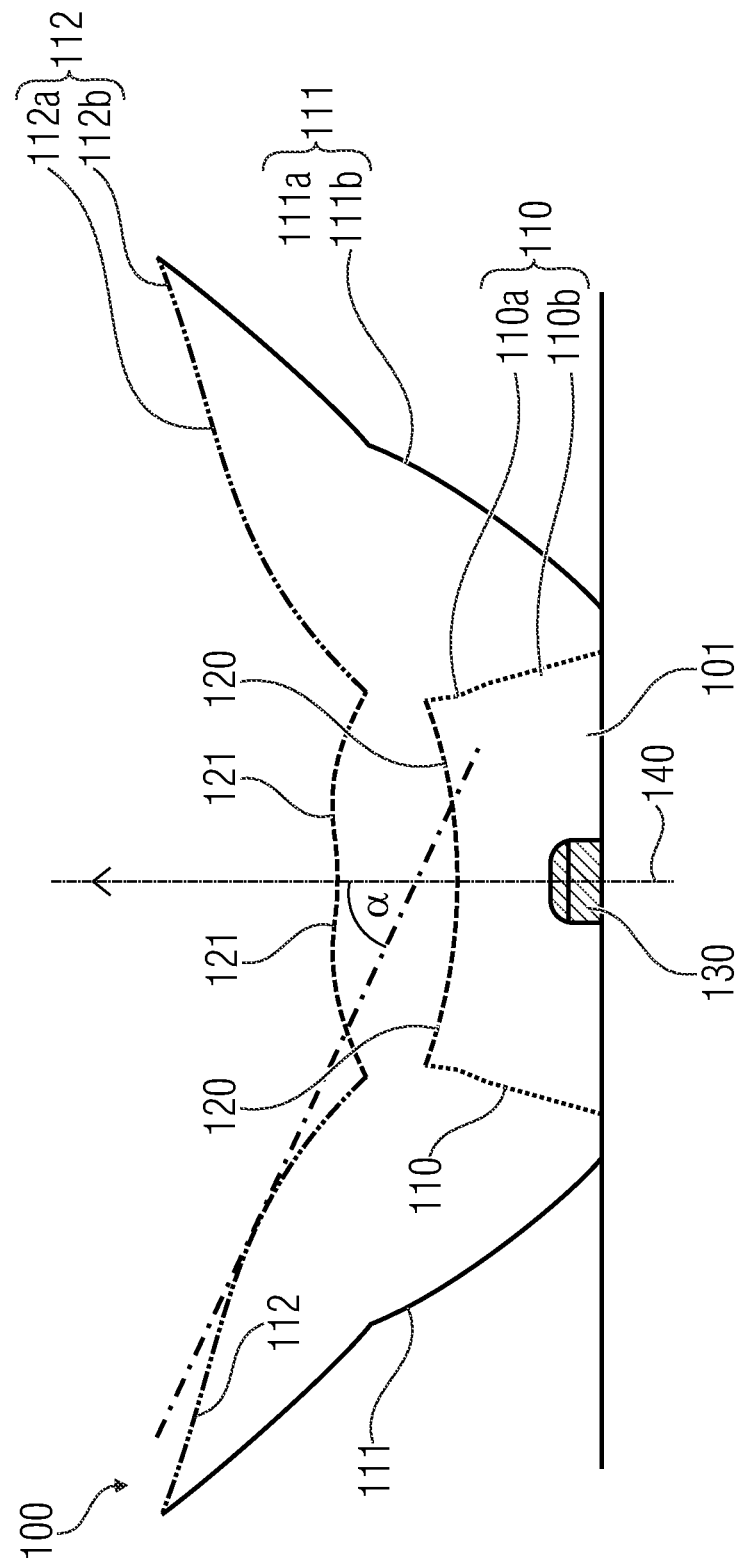
FIG. 1 shows a schematic illustration of optics, for example of Tx-TIR optics (transmission optics based on total internal reflection, TIR) for optically wireless communication means in accordance with embodiments.

Before discussing embodiments of the present invention referring to the appended drawings, it is to be pointed out that elements and structures of equal effect are provided with equal reference numerals so that the description thereof is mutually applicable or interchangeable.

FIG. 1 shows optics 100 implemented by the optical body 100. In this embodiment, the optics 100 is combined with a transmission module 130 configured to transmit along the main radiation direction 140. In this case, this is referred to as Tx-TIR optics. If, however, the optics is combined with a photodetector, this is referred to as Rx-TIR optics.

In this embodiment, it is assumed that the optics 100 or the optical body 100 is a rotationally symmetrical variation, i.e. is rotationally symmetrical around the axis 140. It is also to be pointed out here that the rotational symmetry is not absolutely necessary but that other symmetries, like an axial symmetry, for example (so that the right and left sides are equal, for example), or no symmetry at all would also be conceivable. In this general non-symmetrical variation, the two sides differ geometrically from each other.

Advantageously, the optical body 100 is made from a homogenous material, like a mineral glass or plastic or, generally, an optically transparent material with little absorption in the spectral range of the communication wavelengths. Therefore, it is also conceivable for the material to be non-transparent in the visible range as long as a communication wavelength in the ultraviolet or infrared range is selected. In accordance with embodiments, the optical body 100 comprises a first interface 110+120 and a second interface 112+121. Additionally, the optical body 100 comprises a lateral interface having a total internal reflection region 111. The lateral interface 111 laterally delimits the body from the outside, whereas the interfaces 110+120 and 112+121 delimit the body perpendicularly to the main radiation direction 140.

The interfaces 120 (+110) and 121 (+112) are opposite to each other. The first interface 110 and 120 delimits the optical body 100 from a cavity 101 in which the transmitter 130 or, generally, the transmission and/or reception element 130 is arranged. This cavity 101 is defined along the optical axis 140 by the interface 120, which comprises any curved or convexly curved shape to form a central lens region, and laterally by an interface 110 exhibiting the first refraction region. The optical axis of the lens region 120 can exemplarily be congruent with the rotational symmetry axis 140 and thus be, for example, parallel to the main radiation direction 140 of the transmission element 130. The lens region 120 is configured to map a beam group (for example emitted by the Tx element 130) along the optical axis 140.

The refraction region 110 is arranged relative to the optical axis 140 such that light emitted laterally relative to the optical axis 140 is mapped onto the total internal reflection region 111 by the refraction region 110. The precise shape can vary depending on the degree of refraction and, thus, on the optical density of the body 100 on the one hand and also depending on the material or gas in the cavity 101. On the other hand, the shape results from the surfaces 110 and 112 and the specified power density to be obtained in the spot, or the reception characteristic the optics is to provide when being used as reception optics.

The second, i.e. top interfaces 121+112 also shape a lens region, i.e. the region 121, and a second refraction region 112. This refraction region 112 surrounds the lens region 121 laterally and is configured to map light onto or from the total internal reflection region 111, for example in parallel to the main radiation direction 140 or slightly angled to the main radiation direction 140.

The lens region 121 in this embodiment is arranged in alignment with the lens region 120, i.e. arranged such that the optical axis of the lens region 121 is congruent with the rotational symmetry axis 140. Thus, the beam group transmitted along the main radiation direction 140 is directed in the direction of the main radiation direction 140. In accordance with embodiments, the lens region 121 cooperates with the lens region 120 such that a lens is shaped by the two lens regions 120 and 121. In accordance with embodiments, the lens region 121 exhibits any curvature, in this case convex, for example. In the variation having two convexly curved lens regions 120 and 121, a collecting lens is shaped which passes the radiation emitted along the main radiation direction 140 on along the main radiation direction. It is to be mentioned here that the precise degree of curvature of the lens region 121 and of the lens region 120 depends on the specified power density in the spot and, thus, on the desired focal length. This means that it is also dependent on the distance between the optical body 100 and the transmitter 130 (or receiver). The surfaces of the lens regions 120 can comprise any shape and consequently be classified as free-form areas. Another variation parameter represents the degree of refraction at the interfaces and, thus, the optical density (which influences the refraction index).

The refraction region 112 surrounds the centrally arranged lens region 121 and, in this embodiment, is optionally also implemented to be curved so as to allow shaping of another beam group. It is conceivable for the refraction region to contain Fresnel patterns, which serve for reducing the thickness of the optics.

In accordance with the main embodiment, the optical body 100 comprises another interface 111 to cause total internal reflection of radiation impinging or emitted via the refraction region 110 and 112. At the interface 111, a total internal reflection region 111 is formed which encloses an angle, like, for example, an angle between 5° and 85°, with the main radiation direction 140. In accordance with embodiments, the interface 111 is a general freeform area so that the curvature and, thus, the angle to the main radiation direction 140 vary depending on the position on the interface 111. It is to be mentioned that the angle indications always refer to the angle between the main radiation direction and the respective tangent (see FIG. 1, region 112, angle α). The total internal reflection region 111 cooperates with the refraction regions 110 and 112 so that light emitted laterally by the transmission diode 130, for example, is transmitted by the refraction region 110, impinges on the total internal reflection region 111 and then is directed onto the further refraction region 112 by total internal reflection, and thus leaves the optics 100 in parallel to the optical axis 140, for example, or inclined to the optical axis 140. It is to be mentioned that, in this example, the optical axis corresponds to the main radiation direction. Conversely, light may also be incident through the refraction surface 112 and be directed onto the total internal reflection region 111. By the total internal reflection in the region 111, it is reflected to the refraction region 110 and directed to a reception element 130 where it is detected under a lateral angle of incidence.

After having discussed the structure in correspondence with the basic variation and an extended variation, the mode of functioning will be discussed below.

The optics 100 illustrated here uses both refraction and total internal reflection and thus unites the functionality of a mirror with that of lenses in a single element. The optics module illustrated here represents total internal reflection optics (TIR) to shape the communication channel. The optics 100 or TIR optics 100 (like Tx optics) is placed using one or more transmission/reception elements, in this case a transmission element 130, and shaped such that it guides nearly all the light emitted of the transmission element 130 to the spot. Optionally, several transmission elements 130 can be placed in the cavity 101 when the spatial dimension thereof is relatively small, for example. This usually is the case in LD and micro LED arrays. Discrete emitter devices, however, are also conceivable.

The interfaces in the center 120 and 121, also referred to as lens regions 120 and 121, direct the radiation emitted in small angles (measured from the optical axis 140) into/to the FOV. The interfaces 110, 111 and 112 direct the radiation emitted at larger angles to the FOV as well. Thus, total internal reflection occurs at the interfaces at the lateral edge 111. Radiation having been emitted through the interfaces 112 and 121 can be mutually overlapping after leaving the optics so as to obtain the desired power distribution in the spot, but this is not necessarily the case.

Depending on the material of the transmission optics, it is also possible for the radiation emitted backwards (i.e. at an angle of greater than 90°—measured relative to the optical axis 140) to concentrate in the field of view. Thus, the optics covers more than a half space. In this case, the transmission element 130 is located above the lower end of the cavity 101. The TIR optics can be calculated using the Composite Ray Mapping method [1], wherein the following feature is decisive here. The light emitted by the source 130 is divided into two or more beam groups (or bundles) which are directed onto different surfaces of the optics (120+121 or 110+111+112) and are thus shaped differently. The embodiment performs a division into two or even three beam groups, since the interfaces 110, 111 and 112 exemplarily comprise two sub-regions for the different beam groups each. What follows is a short discussion of how a division into three beam groups could be performed:

The first beam group can be associated to the two central lens regions 120 and 121. The other two beam groups are each shaped by the surfaces 110a, 111a and 112a or 110b, 111b and 112b. The fact that 111 really is two surface regions, for example, can be recognized from the fold in the center of 111, between 111a and 112b. The surfaces can be subdivided into any number of surface portions so that even more than three beam groups can be transmitted. What becomes clear here is that all the surfaces 110, 111, 112 are freeform areas.

Fields of view having high an aspect ratio, i.e. greatly different dimensions along different axes become possible when the different beam groups illuminate different regions of the field of view and the combination of all the beam groups shape the entire field of view. Both the total internal reflection surfaces 111 and the outer surfaces 112, 121 can easily be used to transfer the rotationally symmetrical emission profile of the emitter to a rectangular/squared or elliptical field of beams. The Tx-TIR optics 100 is developed for a real source, which means that the emitter 130 has a spatial dimension and the real distance profile thereof is approximated by a mathematical function. The Tx-TIR optics 100 is able to form a spot of any shape, depending on the design. Typically, a circular, elliptical or rectangular spot is shaped. The dimension of the respective field of view can be as is desired. The power distribution within the spot can be both homogenous and inhomogeneous. In case the formed spot is circular and the emission profile of the emitter is rotationally symmetrical, the axis 140 corresponds to the rotational axis of the Tx-TIR optics. Otherwise, for example with rectangular or elliptical spots, the optics is not rotationally symmetrical. In this case, the axis 140 is not to be understood to be the rotational axis, but rather the main radiation axis, and serves for placing the emitter or receiver 130 or for general orientation.

The Tx-TIR optics 100 can be used with both visible and ultraviolet or infrared light. Thus, the primary function of this optics explicitly is not illumination, but optical wireless communication.

It is to be pointed out here that the above aspect has been discussed in the context of a transmitter (cf. Tx-TIR optics), but of course it is to be understood to relate also to a receiver having a reception module instead of a transmission module 130. This means that the optics discussed above is also applicable as Rx-TIR optics.

Figure 2:
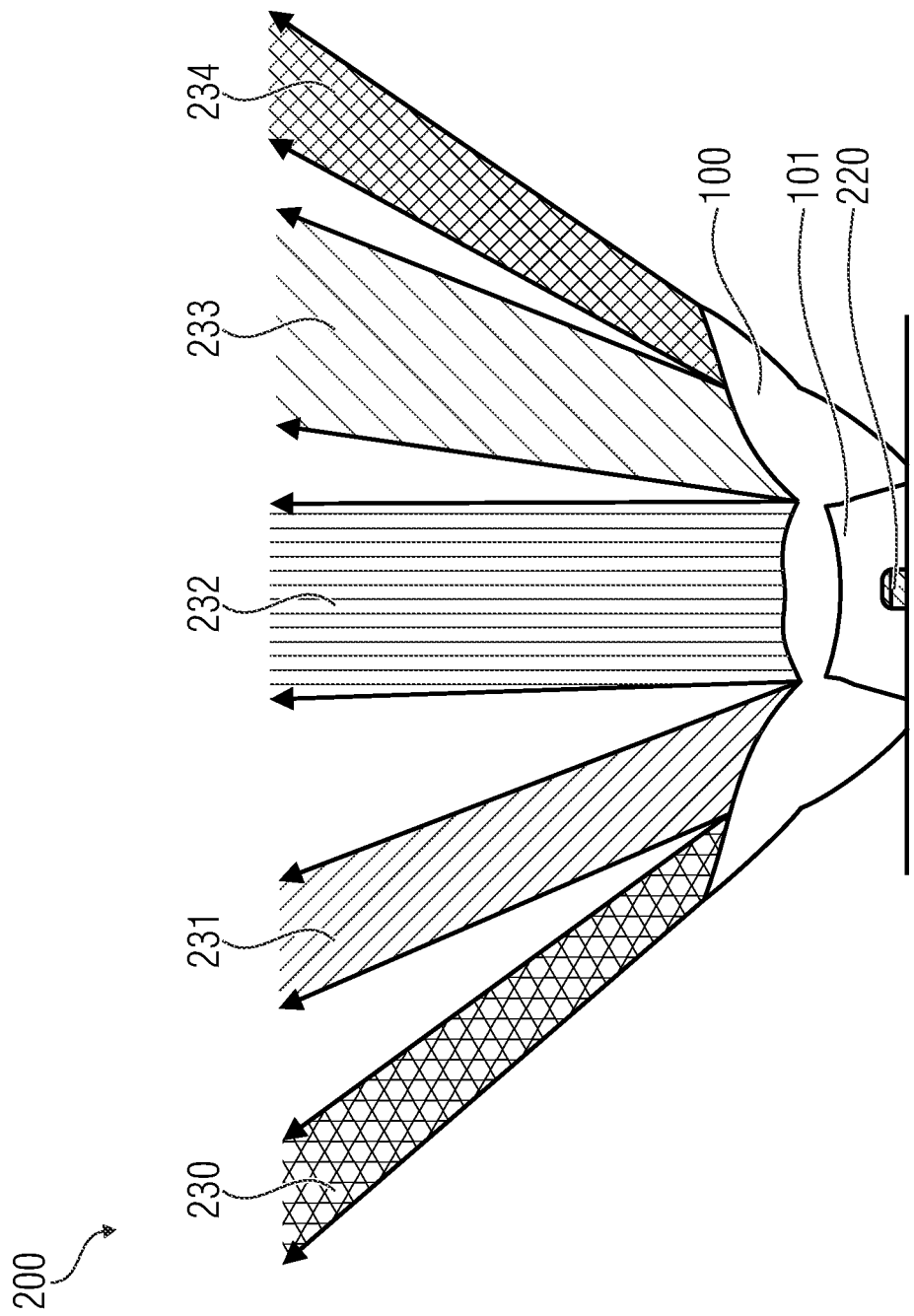
FIG. 2 shows a schematic illustration of the optics of FIG. 1 in the case of transmission for establishing several beam groups or for setting up several communication channels in accordance with embodiments.

Referring to FIG. 2, application of the optics 100 will be discussed. The optics 100 here is used as a transmission element, together with an emitter 220, and thus forms the transmitter 200. In this special case of application, the Tx-TIR optics 100 can be used for communication using several channels. These channels characterized by the reference numerals 230, 231, 232, 233 and 234 are spatially separate from one another. Two basically different scenarios are to be differentiated between.

As is illustrated in FIG. 2, the different beam groups of an emitter 220 are directed by the Tx-TIR optics 100 to different directions and illuminate different receivers, which receive the signals. In case the Tx-TIR optics 100 is not rotationally symmetrical, the emission angles of the fields of view 230 and 234 and 231 and 233 can be different so that all in all five reception apparatuses can be provided with signals from the emitter 220. As is illustrated here, the emitter 220 in turn is placed in the center in the cavity 101.

The five separate channels 230 to 234 are mapped as follows. The central channel 232 is formed by the interfaces 120 and 121 (cf. FIG. 1) along the main radiation direction 140. Channel 234 is formed by the sub-regions 112a, 111a and 110a. On the opposite side, channel 230 is formed by the opposite surfaces. Channel 233 is formed using the surfaces 110b, 111b and 112b, whereas the channel 231 is formed by the opposite surfaces.

In accordance with a second variation, the Tx-TIR optics can also be used in an MIMO configuration.

Figure 3:
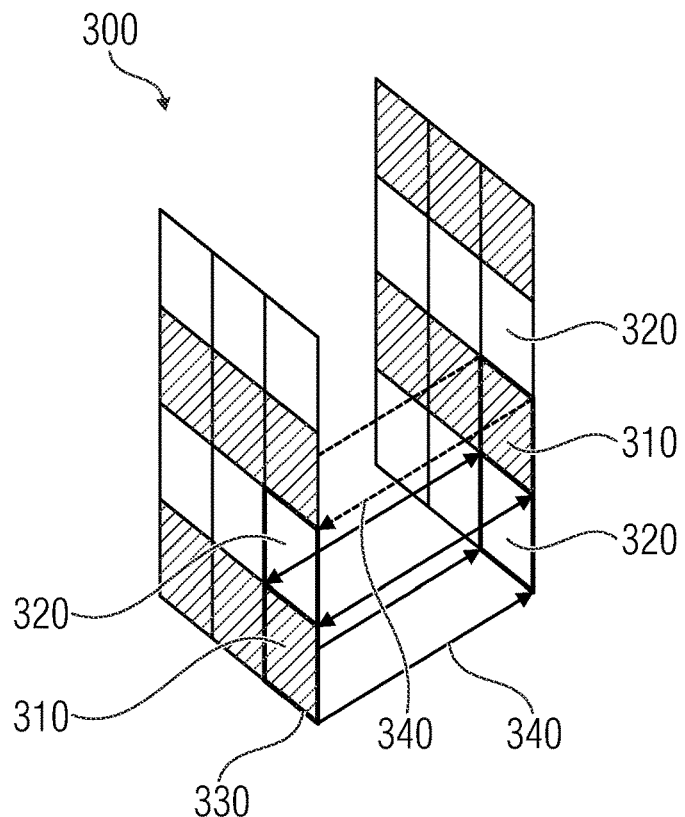
FIGS. 3, 4 show schematic illustrations for illustrating an MIMO approach in accordance with embodiments.

Here, it would be conceivable for several transmitters or receivers or transceivers, including the respective optics, to be arranged in a field, as is shown in FIG. 3, for example. FIG. 3 shows an MIMO approach having separate transmitters 310 and receivers 320. One neighboring transmitter 310 and receiver 320 each form a transceiver 330. The transmitter 310 forms a unidirectional channel 340 with the opposite, geometrically associated receiver 320 each. Two neighboring unidirectional channels correspondingly form a bidirectional communication channel, which has a full-duplex capability. For the best possible utilization of the surface, the regions for the transmission and reception elements are exemplarily of a square shape. It is to be mentioned here that, in accordance with embodiments, the reception element is square or rectangular, whereas the transmission optics does not necessarily or advantageously comprise such a floor plan as long as it illuminates the receive region in squares/rectangles. This is how a field having a plurality of Tx-TIR optics having respective transmitters arranged therein, together with a plurality of receivers, which may exemplarily also comprise Rx-TIR optics, forms an array configured for bidirectional transmission. The complete transceiver 230 is only formed by the combination of the spatially separate transmitter (emitter plus optics) and receiver (detector plus optics). As has been discussed before, this transceiver is bidirectional and obtains an ideal channel density by advantageously shaping the channel to be rectangular or squared. Due to the compactness of the optics and the capability of shaping the communication channel almost as desired, transceivers of such a setup are predestined for maximizing the data rate by means of MIMO. It is to be pointed out here that the optics of the receiver does not necessarily have to correspond to the TIR optics 100 illustrated above, but can also be implemented differently.

Figure 4:
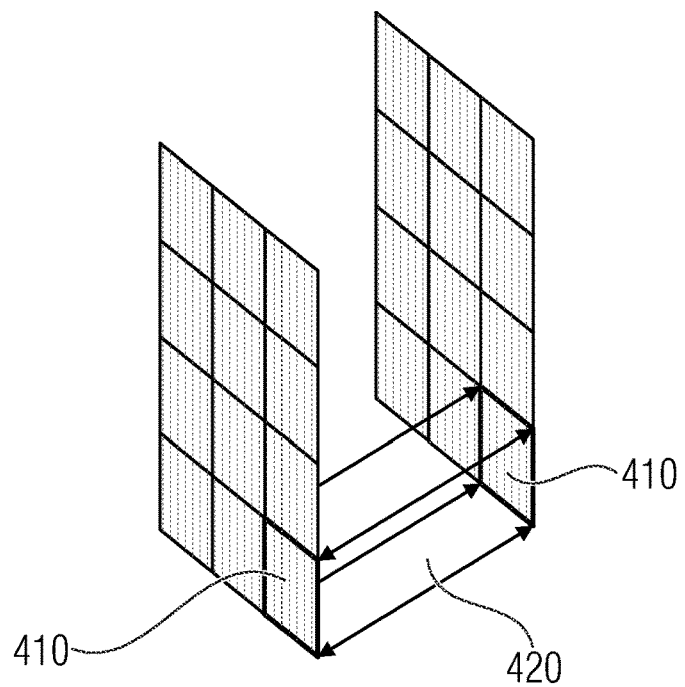

In FIG. 4, another MIMO system having transceivers is illustrated. The transmitter and the receiver are combined in a square field element provided with the reference numeral 410. The optical communication channel formed is bidirectional, wherein the forward and backward channels comprise the same spatial dimension and position. In this variation, advantageously, Tx optics is used in combination with a receiver and a transmitter arranged within the cavity. The area consumption of the bidirectional MIMO approach can roughly be halved by arranging the transmitter and the receiver together in the optics. Here, the forward and backward channels can also comprise the same position in space to generate a true bidirectional channel which comprises both, a half and full-duplex capability. Each field element 410 represents a complete transceiver consisting of a transmitter and a receiver. It is to be pointed out here that sending, for example, is realized using the central lens regions, whereas reception takes place via the refraction region 112 or via the total internal reflection regions 111. It is, of course, also possible for the association of the optical regions used for transmission and reception purposes to be reversed or combined differently when, for example, considering that more than two spatially separate transmission channels can be formed by means of the optics.

Referring to FIGS. 5a and 5b, the usage of the optics 1 discussed in FIG. 1, in combination with a receiver and a transmitter will be discussed below.

FIGS. 5a and 5b each show the optics 100 in combination with an emitter 510 and a photodetector (like photodiode) 520. The photodetector 520 and the emitter 510 are both arranged in the cavity 101, for example next to each other. In FIG. 5a, the dot-dash lines illustrate which regions of the interfaces are used for the transmission mode (cf. emitted radiation 550), whereas, in FIG. 5b, the dot-dash lines show which regions of the interfaces are used for receiving the incident radiation 560. The light beams 550 and 560 indicated are to be understood to be exemplary beams, but not edge beams.

The central interface 540 of the optics 500 or 100 is shaped such that it directs the radiation 550 emitted by the emitter 510 into the field of view. The outer regions 530 of the optics concentrate the incident radiation 560 onto the photodetector 520. Since in this embodiment the photodetector 520 is not located centrally below the optics (i.e., it is not located on the optical axis like the receiver 510 or, generally, the module corresponding to the lens elements 540), advantageously, the optics is not implemented to be rotationally symmetrical in order for the point of focus of the outer interfaces 530 to be located on the photodetector 520. If, in accordance with embodiments, a ring-shaped detector is used, it can be placed (concentrically) around the emitter. In this special case, in accordance with further embodiments, the optics module 100 or 500 can also be implemented to be rotationally symmetrical.

The approach can be realized both using LEDs and LDs. The optimum performance in this case is achieved when the emitter emits its radiation over a smallest possible spatial angle. In this case, the TIR optics can be defined such that all the emitted radiation impinges on the central region. This region can be implemented to be as small as possible so that the surface of the outer regions can be maximized. This increases the optical amplification of the receive signal.

In the above embodiments, it has been assumed that one, two or three properly separated channels can be generated using optics. Depending on the specific implementation of the lens regions, in particular depending on the precise implementation of the total internal reflection regions, in combination with the outer core surfaces (refraction regions), a greater number of channels can, of course, also be formed. Unsymmetrically implemented optics is predestined for forming several channels. Only with a precise implementation (cf. embodiments of FIG. 5) can the arrangement of emitter and detector on the optical axis 140, or offset to it, vary.

In accordance with embodiments, certain surfaces or all the surfaces, except for the total internal reflection one, can be provided with an anti-reflection layer to reduce back reflection. Additionally, the total internal reflection region can, for example, be partly provided with a reflective layer to force reflection at those locations where total internal reflection fails.

With regard to the geometries (curvatures, convex curvatures) of the lens regions and the refraction regions and sub-regions of the refraction regions, it is to be pointed out that, depending on the implementation, they can be shaped such that focusing of the incident or exiting radiation onto a corresponding transmitter or receiver, or from a corresponding transmitter or receiver, is allowed. The dimensioning and design of these surfaces are dependent on the shape of the communication channel, the refraction indices used, maybe additional layers and the refraction indices of the surrounding material. In addition, the wavelength used for the communication channel also plays a role.

Another embodiment relates to a method for manufacturing the optics. Advantageously, the optics is to be manufactured from a homogenous material in an injection molding method. The advantage here is that the optics is formed in one step, so that no post-processing is necessary, so that the overall manufacturing costs are reduced. If a smaller number of prototypes of the optics are to be manufactured, it is alternatively also possible to produce these using a turning or milling process, entailing high precision. It is to be pointed out here that a description of a product feature is to be understood to be also a description of a method step.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] Donglin Ma, Zexing Feng, and Raongguang Liang: "Freeform illumination lens design using composite ray mapping"; Appl. Opt. 54; 598-503; 2015

The invention claimed is:

1. A data communication module comprising optics and a transmission or a reception element or a transmission and reception element arranged in a cavity or centrally in a cavity and configured to emit and/or receive a signal in a main radiation direction,
   wherein the optics comprises an optical body formed of a material optically transparent for a communication wavelength, the optics comprising:
   the cavity, wherein a first interface is formed between the cavity and the optical body;
   a second interface formed opposite the cavity; and
   a lateral interface of any shape comprising a total internal reflection region,
   wherein the first interface forms a first central lens region and a first refraction region surrounding the first central lens region, and wherein the second interface forms a second central lens region and a second refraction region surrounding the second central lens region;
   wherein the first and second central lens regions are configured to map a first beam group in a direction of the main radiation direction; and wherein the second refraction region of the second interface is configured to map a second beam group along a second radiation direction which is angled to the main radiation direction.

2. The data communication module in accordance with claim 1, wherein the first central lens region and the second central lens region correspond to a freeform area which can be shaped as desired, and/or wherein Fresnel patterns are introduced in this region to reduce a thickness of the optics.

3. The data communication module in accordance with claim 1, wherein the total internal reflection region comprises a Fresnel pattern; and/or
wherein the first interface and/or the second interface comprise a Fresnel pattern.

4. The data communication module in accordance with claim 1, wherein two spatially separate transmission channels are shaped by the first and second beam groups.

5. The data communication module in accordance with claim 1, wherein the first refraction region of the first interface in one region encloses an angle of smaller than or equal to 45° or smaller than or equal to 60° with the main radiation direction.

6. The data communication module in accordance with claim 1, wherein the second refraction region of the second interface in one region encloses an angle of greater than or equal to 45° or greater than or equal to 30° with the main radiation direction.

7. The data communication module in accordance with claim 1, wherein the second refraction region of the second interface is curved as desired; or
wherein the second refraction region of the second interface is curved as desired or convexly curved such that at least two differently angled sub-regions of the second refraction region are formed.

8. The data communication module in accordance with claim 7, wherein a first sub-region of the second refraction region of the second interface is configured to map the second beam group along the second radiation direction, and wherein a second sub-region of the second refraction region of the second interface is configured to map a third beam group along a third radiation direction, wherein the second and third radiation directions enclose an angle, and the second and third radiation directions enclose another angle relative to the main radiation direction.

9. The data communication module in accordance with claim 1, wherein the lateral interface encloses an angle in a range of 5° to 85° with the main radiation direction.

10. The data communication module in accordance with claim 1, wherein the total internal reflection region comprises two sub-regions; and/or
wherein a first sub-region of the total internal reflection region is configured to map the second beam group along the second radiation direction, and wherein a second sub-region of the total internal reflection region is configured to map a third beam group along a third radiation direction, wherein the second and third radiation directions enclose an angle and the second and third radiation directions enclose another angle relative to the main radiation direction.

11. The data communication module in accordance with claim 1, wherein the total internal reflection region is curved as desired, or
wherein sub-regions of the total internal reflection region are each curved as desired.

12. The data communication module in accordance with claim 1, wherein the optical body is axially symmetrical or rotationally symmetrical around an axis along a main emission direction or rotationally symmetrical around an axis along the main emission direction through the transmission and/or reception element.

13. The data communication module in accordance with claim 12, wherein the first refraction region of the first interface and the second refraction region of the second interface extend in a shape of a circular arc area around the axis or a freeform area around the axis.

14. The data communication module in accordance with claim 1, wherein the transmission element comprises a light-emitting diode or laser diode, and/or wherein the reception element comprises a detector, including a photodiode.

15. An array of data communication modules comprising a data communication module in accordance with claim 1, wherein the first beam group is mapped in a direction of the main radiation direction by means of the first and second central lens regions and at least the second beam group is mapped by means of the total internal reflection region and/or the first and second refraction regions; or
wherein the first beam group is mapped in a direction of the main radiation direction by means of the first and second central lens regions and at least the second beam group is mapped by means of the total internal reflection region and/or the first and second refraction regions; and wherein the first and second beam groups are mapped such that a transmission signal and a reception signal alternate along a lateral extension direction of a transceiver array.

16. An array of data communication modules comprising spatially separate transceiver and receiver in accordance with claim 1,
wherein the spatially separate transceiver and receiver are arranged next to one another; or
wherein the data communication modules arranged next to one another are arranged such that a transmitter configured for transmitting alternates with a receiver configured for receiving along an extension direction of a transceiver array.

17. A system of several data communication modules comprising at least two arrays of data communication modules in accordance with claim 1, wherein the at least two arrays of data communication modules are opposite one another such that a lens region configured for receiving or second refraction region is geometrically associated to a lens region configured for transmitting or second refraction region; or
wherein the at least two arrays of data communication modules are opposite one another such that a receiver configured for receiving is geometrically associated to a transmitter configured for transmitting.

18. An array of data communication modules in accordance with claim 1, wherein a lens region configured for receiving or second refraction region comprises a square or rectangular shape; or
wherein a receiver configured for receiving comprises a square or rectangular interface.

19. The data communication module in accordance with claim 1, wherein the transmission element is configured to transmit a data signal sequence or wherein the reception element is configured to transmit a data signal sequence.

20. The data communication module in accordance with claim 1, wherein the second radiation direction points away from the main radiation direction.

21. The data communication module in accordance with claim 1, wherein the first beam group is configured to transmit a first data signal sequence and the second beam group is configured to transmit a second data signal sequence being different from the first data signal sequence.

* * * * *